United States Patent Office 3,681,277
Patented Aug. 1, 1972

3,681,277
PROCESS FOR PREPARING SOLVENT-FREE PRESSURE-SENSITIVE ADHESIVE FROM A POLYISOCYANATE, A POLYOXYALKYLATED DIOL OR POLYOL AND A TACKIFIER
Kurt Scholz and Kurt Hagenweiler, Remagen-Kripp, Germany, assignors to Badische Anilin- & Soda-Fabrik Aktiengesellschaft, Ludwigshafen (Rhine), Germany
No Drawing. Filed Jan. 26, 1970, Ser. No. 5,902
Claims priority, application Germany, Jan. 28, 1969, P 19 04 102.2; Feb. 14, 1969, G 69 05 885.1
Int. Cl. C09j 3/26
U.S. Cl. 260—24
8 Claims

ABSTRACT OF THE DISCLOSURE

Production of pressure-sensitive adhesives comprising a solution of a tackifying resin in a poly(alkylene oxide) and an organic diisocyanate or polyisocyanate.

This invention relates to pressure-sensitive adhesives composed of poly(alkylene oxides), diisocyanates or polyisocyanates and tackifying resins and a process for the manufacture of such pressure-sensitive adhesives in which the use of solvents is not necessary.

It is known that adhesive compositions composed of rubbers or phenolic resins may be spread without the use of solvents (German Patent 748,487; "Kunststoffe," 54, 381 et seq. (1964)). A drawback of such methods is that the adhesive compositions may only be applied in a softened state, that is to say, at high temperatures. A great deal of machinery is required to transport hot tacky compositions to the final applicator and keep them hot, and this method is consequently very expensive. Such processes have not achieved any practical significance.

U.S. Pat. 3,246,049 described solvent-containing adhesive compositions comprising isocyanates and esters of castor oil and carboxylic acids. The adhesive compositions are dissolved in non-polar solvents such as xylene and then applied to the substrate. Such a method also involves the use of expensive machinery, since the solvent must be sucked off after application of the composition. This requires a drying tunnel which, with conventional spreading machines, has a length of from 40 to 60 meters, and also an explosion-proof room. The rate of application is, moreover, dependent on the efficiency of the drying tunnel and thus usually restricted.

It is thus an object of the invention to provide a process for the manufacture of a pressure-sensitive adhesive from cheap materials, which adhesive may be rapidly applied at room temperature without the use of solvents such that application thereof requires no expensive machinery.

We have found that such desirable advantages are provided by pressure-sensitive adhesives which are obtained by mixing:

(a) from 62 to 90% by weight, preferably 75 to 88%, of a poly(alkylene oxide) having a molecular weight of from 300 to 10,000 and a hydroxyl number of from 30 to 85, with (b) from 8 to 30% by weight, preferably 13 to 17%, of a usual tackifyer resins, and (c) from 2 to 8% by weight, preferably 2 to 5%, of an aromatic and/or aliphatic diisocyanate and/or polyisocyanate;

the percentages by weight being based on the total weight of the components a, b and c.

The pressure-sensitive adhesives of the invention may be applied without the use of solvents and possess, in addition to the above desirable characteristics, high coefficients of adhesion, for example coefficients of adhesion of approximately 500 (as measured by the Afera standard), and they have relatively good resistance to non-polar solvents.

The starting material (a) for the manufacture of the pressure-sensitive adhesives may be a poly(alkylene oxide) which is unbranched, branch-chained or partly branched. Examples of suitable compounds are those obtained by the polyoxyalkylation of dihydric or polyhydric, preferably dihydric and/or trihydric, alcohols, such as ethylene glycol, propylene glycol, trimethylol propane and glycerol, with ethylene oxide and/or preferably propylene oxide. Mixtures of different poly(alkylene oxides), such as those produced from alcohol mixtures by the addition of ethylene oxide and/or propylene oxide, may also be used. Suitable poly(alkylene oxides) have molecular weights of from 300 to 10,000 for example from 900 to 5,000 and preferably from 1,500 to 4,000 and more preferably from 2,100 to 3,000, and hydroxyl numbers ranging from 30 to 85, preferably from 45 to 75 and more preferably from 50 to 65.

The starting material (c) consists of aliphatic and/or preferably aromatic diisocyanates and/or polyisocyanates, such as hexamethylene diisocyanate, 4,4'-diisocyanato-diphenylmethane, 1,5-diisocyanato-naphthalene, 1,4-diisocyanato-benzene, 4,4',4''-triisocyanato-triphenylmethane, tris(4-isocyanatophenyl)-thiophosphate and preferably 2,4- or 2,6-diisocyanato-toluene and the known addition compounds from 1 mole of trimethylolpropane and 3 moles of diisocyanato-toluene.

The components (a) and (c) are preferably used in such proportions that there are from 0.25 to 0.98, preferably from 0.35 to 0.90 and more preferably from 0.40 to 0.70 equivalents of isocyanate groups from the di- or poly-isocyanates present per equivalent of hydroxyl groups from the poly(alkylene oxide). In this way products are obtained which still contain free hydroxyl groups.

Reaction of components (a) and (c) produces products showing a certain degree of tackiness, but they do not constitute valuable pressure-sensitive adhesives.

An important feature of the invention is the use of tackifyer resins as component (b). Suitable, commonly used tackifiers are natural resins, modified natural resins and synthetic resins. The tackifiers are solid, amorphous, hard to brittle, thermoplastic substances softening at temperatures ranging from 40° to 140° C. and generally having a molecular weight or mean molecular weight between 200 to 1,500. This resin must be compatible with the poly(alkylene oxide), that is to say, a solution of the resin in the poly(alkylene oxide) should not segregate at ambient temperatures. For example, the resin should have a solubility in poly(propylene oxide) having a molecular weight of 2,000 of at least 10% at 100° C., but should preferably have unlimited miscibility with said polymer at 100° C.

Suitable natural resins and modified natural resins are, for example, terpene resins (also known as polyterpenes), balsamic resins, rosins and rosin derivatives, hydrogenated rosin, esters of rosin or hydrogenated rosin, such as the glycerol ester, the pentaerythritol ester, the ethylene glycol ester, the diethylene glycol ester or the propyl ester of (hydrogenated) rosin. Such products are commercially available. Esters of the hydroabeityl alcohol which is produced when rosin is completely hydrogenated are also suitable, for example the benzoic acid and phthalic acid esters. The usual terpene phenolic resins and also the synthetic resins: ketonic resins, coumarone resins and indene resins, and also hydrocarbon resins, are also suitable. Polyvinyl ether is also a suitable tackifier resin.

Of the suitable tackifiers those are preferred which contain few acid groups and have an acid number of less than 20, preferably of from 0 to 5, such as terpene resins, terpene phenolic resins and ester resins. It is particularly advantageous to use mixtures of different tackifier resins, for example mixtures of 2 to 4 different resins. If resins having different softening points are used in admixture with each other, for example if the mixture consists of resins having a softening point of about 70° C. and resins having a softening point of about 120° C., the resulting pressure-sensitive adhesives may be used within a larger range of temperatures than pressure-sensitive adhesives based on only one resin.

The three components are used in the following proportions: component (a): 62 to 90%, preferably 75 to 88% by weight; component (b): 8 to 30%, preferably 8 to 20% and more preferably 13 to 17% by weight; component (c): 2 to 8%, preferably 2 to 5% by weight.

The quality of the product is subject to the manufacture and application of the pressure-sensitive adhesive being carried out under specific conditions. Good products are obtained when the tackifier is first of all dissolved in the poly(alkylene oxide) and the di- or polyisocyanate is then added whilst avoiding high temperatures. This mixture is then quickly shaped while still capable of flow, that is, it is spread on the films or any desired substrate. After shaping, the mixture is allowed to finish reacting, and there is then obtained a more or less soft, substantially solvent-resistant, virtually insoluble contact adhesive, that is, a pressure-sensitive adhesive composition.

The following is a more detailed description of the process. The usual commercial poly(alkylene oxide) is conveniently first of all substantially freed of its moisture content, for example by warming under reduced pressure. It is advisable to ensure that the moisture content of the product is not substantially greater than 0.1%. The same applies, of course, to the other components, but they are normally inherently free of water or virtually so. The poly(alkylene oxide) is mixed with the resin or resins in such a manner that a clear, uniform solution is obtained. Usually, the mixture is heated, with stirring, to about temperatures near the softening point of the resin, for example to 40 to 160° C. and preferably to 60 to 140° C. until a clear solution forms. According to the type of poly(alkylene oxide) used and the amount of tackifier employed, the resulting solution will vary in viscosity, at room temperature, from about 2,000 to 15,000 centipoises. Solutions showing a viscosity of more than 20,000 centipoises are less suitable.

If, in the manufacture of the pressure-sensitive adhesive, no resin or less than 8% by weight of resin is used, its adhesive power is unsatisfactory, and if more than 30% by weight of resin is used, the pressure-sensitive adhesive loses some of its adhesiveness within a few days or weeks and it segregates and is no longer homogeneous.

At the same time as the resin or subsequently thereto, but preferably before the addition of the di- or poly-isocyanate, there may be added further usual assistants such as dyes, fillers, pigments, plasticizers, aging retardants, antioxidants, light stabilizers and usual catalysts for the acceleration of the subsequent reaction of the hydroxyl groups with isocyanate groups. Valuable catalysts are, for example, dibutyltin dilaurate or stannous octoate.

When admixing the prescribed quantity of di- or poly-isocyanate temperatures above 50° C. should be avoided if possible. The resulting mixture should then be further processed as quickly as possible. In this phase, mixing and processing are generally carried out at room temperature and the mixing and shaping operations are completed in less than 15 minutes. Preferably, shaping is effected within a period of from 5 seconds to 5 minutes after mixing, longer periods being used at lower temperatures and shorter periods at higher temperatures. The process of shaping the mixture is generally carried out under certain viscosity conditions, that is, the mixture is conveniently processed as long as it exhibits a viscosity of less than 80,000 centipoises and preferably of 5,000 to 30,000 centipoises. Shaping mixtures having viscosities above 80,000 centipoises is frequently difficult and should be avoided if possible. As no solvent has to evaporate out of the mixture—the use of any sort of solvent is advantageously avoided in preparing the mixture—the pressure-sensitive adhesive may be used in layers of any desired thickness and shaped articles of any kind and size may be made. The main use of the adhesive is in the manufacture of adhesive tapes and adhesive films, and the adhesive may be applied to a fabric or to sheet-like substrates of, for example, paper, cellulose, cellulose acetate, cellophane, polyester, polyamide, poly(vinyl chloride), polyethylene, polypropylene and the like as a thin coating. The thickness of the coating is generally greater than $20\mu$ and preferably greater than $25\mu$, corresponding to coating weights of more than 20 and 25 g./m.$^2$ respectively.

After processing, the pressure-sensitive adhesive composition is allowed to finish reacting, the reaction being complete in a few seconds to a few hours, depending on the temperature. The viscosity of the mixture increases rapidly, and it soon forms a gel and solidifies to a more or less soft, elastic mass having excellent contact adhesion characteristics. If the composition is heated after application to temperatures ranging from 50° to 100° C., the composition will solidify within one or a few minutes, and the film may be wound up, if necessary after placing a parting film thereon.

The pressure-sensitive adhesive is also ideal material for the manufacture of self-adhesive sealing compositions, insulating material and the like. Shaped articles, such as panels, made from the adhesive are contact adhesive at their surface, whereas the rest of the article is solid and elastic.

It is also possible to add conventional foaming agents to the adhesive composition during its manufacture and to allow the composition to foam during the period in which it solidifies after the shaping operation, until the desired density, approximately from 0.2 to 0.8 g./cm.$^3$, is achieved. There are thus obtained pressure-sensitive adhesive foams.

Although it is not necessary to incorporate a catalyst for curing the adhesive after it has been processed, the presence of such a catalyst does shorten the curing time substantially, however. The advantage to be gained is that the pot life may be adjusted according to the choice of catalyst and the quantity used to correspond to the time required for processing.

A modified method, which is made use of in order to incorporate very large proportions of resin in the adhesive composition, comprises using plasticizers, for example low molecular weight polystyrene, in quantities ranging from 5 to 30% by weight of the total weight of components (a), (b) and (c). Styrene may be used in place of polystyrene, in which case a conventional peroxide catalyst will be added with the other components so that curing of the polyurethanes will be accompanied by polymerization of the styrene.

The invention is further illustrated by the following examples in which the parts are by weight.

EXAMPLE 1

A mixture is prepared consisting of:

| | Parts |
|---|---|
| Polypropylene glycol (molecular weight about 2,500, hydroxyl number about 55) | 100 |
| Terpene phenolic resin, M.P. 63 to 70° C. | 10 |
| Terpene phenolic resin, M.P. 117 to 130° C. | 2 |
| Phthalic acid ester of commercial hydroabietyl alcohol, M.P. 60 to 70° C. | 4 |

The mixture is heated to a temperature of 130° C. and intimately mixed at that temperature. It is then allowed to cool to room temperature, and 3.9 parts of toluylene diisocyanate and 0.3 part of stannous octoate are added.

The adhesive composition is immediately spread on to a film of poly(vinyl chloride). It is allowed to react for 1 hours at room temperature. There is thus obtained a pressure-sensitive adhesive coated film having excellent tack.

EXAMPLES 2 to 20

The following table illustrates further examples of adhesive compositions prepared in manner similar to that described in Example 1 but containing reactants as indicated in the table and in the quantities stated. All of the resulting adhesive compositions have excellent tack.

| Example | 2 | 3 | 4 | 5 | 6 | 7 | 8 | 9 | 10 | 11 | 12 | 13 |
|---|---|---|---|---|---|---|---|---|---|---|---|---|
| Starting material: | | | | | | | | | | | | |
| Poly(propylene oxide) mol. wt. approx. 2,500, OH number approx. 55 | 100 | 100 | 100 | | | | 100 | 100 | | | | |
| Poly(propylene oxide) mol. wt. approx. 3,000, OH number approx. 55 | | | | 100 | | | | | | 100 | | 100 |
| Poly(propylene oxide) mol. wt. approx. 900, OH number approx. 70 | | | | | 100 | 100 | | | 100 | | 100 | |
| Terpene phenolic resin, M.P. 63 to 70° C | 8 | 16 | | 6 | 6 | | 8 | | 4 | | 8 | 8 |
| Terpene phenolic resin, M.P. 117 to 130° C | 4 | | 8 | 4 | 4 | 10 | 4 | | 4 | 4 | 4 | 4 |
| Phthalic acid ester of commercial hydroabietyl alcohol, M.P. 60 to 70° C | 4 | | 4 | 4 | | | 4 | 14 | 4 | 4 | 4 | 4 |
| Methyl ester of hydrated rosin | 4 | | | | 4 | | | 4 | | | | |
| Toluylene diisocyanate | 3.9 | 3.9 | 3.9 | 3.9 | 3.9 | 7.3 | 7.3 | 2.1 | | | 5.8 | 8 |
| 4,4'-diphenylmethane diisocyanate | | | | | | | | | 5.8 | | | |
| Adduct of 1 mole trimethylol propane and 3 moles diisocyanate-toluene | | | | | | | | | | 9 | | |
| Stannous octoate | 0.3 | 0.3 | 0.3 | 0.3 | 0.3 | 0.3 | 0.3 | 0.3 | 0.3 | 0.3 | 0.3 | 0.3 |

| Example | 14 | 15 | 16 | 17 | 18 | 19 | 20 |
|---|---|---|---|---|---|---|---|
| Starting material: | | | | | | | |
| Poly(propylene oxide) mol. wt. approx. 2,500, OH number approx. 55 | 100 | 100 | 100 | 100 | | 100 | 100 |
| Copolymer of poly(ethylene oxide) and poly(propylene oxide) (40:60) mol. wt. approx. 2,200, OH number approx. 50 | | | | | 100 | | |
| Terpene resin, M.P. 63 to 75° C | | | | | 16 | | 4 |
| Terpene phenolic resin, M.P. 63 to 70° C | 8 | 18 | 8 | | | | |
| Terpene phenolic resin, M.P. 117 to 130° C | 4 | | 10 | | | | 4 |
| Phthalic acid ester of commercial hydroabietyl alcohol, M.P. 60 to 70° C | 3 | | | | 24 | | 4 |
| Methyl ester of hydrogenated rosin | 4 | | | 14 | | | 4 |
| Acrylic ester copolymer as filler | 10 | 50 | 50 | | | | |
| Hexamethylene diisocyanate | | | | | | 5.1 | |
| Toluylene diisocyanate | | 4 | 5 | 5 | 3.9 | 3.9 | 3.9 |
| Poly(vinyl chloride) dispersible powder | | 1 | 1 | | | | |
| Stannous octoate | 0.3 | 0.3 | 0.3 | 0.3 | 0.3 | 0.3 | 0.3 |

EXAMPLE 21

Following the procedure described in Example 1, the following recipe is used:

| | Parts |
|---|---|
| Poly(propylene glycol) mol. wt. 2,500, OH number 55 | 100 |
| Terpene phenolic resin, commercial, non-base-reactive M.P. 63 to 70° C. | 10 |
| Terpene phenolic resin, M.P. 117 to 130° C. | 5 |
| Poly(vinyl ether) | 20 | are mixed with warming, and then, at room temperature, 0.3 part of stannous octoate and 4.6 parts of toluylene diisocyanate are added, and the whole is then spread on to crepe paper at an application rate of 50 g./m.². The paper is then air-heated at 50° C. for a short period and finally wound into rolls. There is thus obtained a crepe adhesive tape having a high tack.

EXAMPLE 22

The following components are mixed with warming:

| | Parts |
|---|---|
| Poly(propylene glycol) mol. wt. 2,500, OH number 55 | 100 |
| Terpene phenolic resin, M.P. 63 to 70° C. | 10 |
| Titanium dioxide | 10 |
| Kaolin | 90 |
| Aerosil | 5 | and there are then added, at room temperature,

| | |
|---|---|
| Toluylene diisocyanate | 5.5 |
| Stannous octoate | 0.3 to 1.5 |

The mixture is processed into film of 1 to 5 mm. gauge (between parting films). There is thus obtained a bilaterally self-adhesive film, which is also useful as a sealing material.

Similar results are obtained when the terpene phenolic resin is replaced by 20 parts of commercial hydrocarbon resin having a melting range of from 90° to 105° C.

We claim:

1. A process for the manufacture of a pressure-sensitive adhesive which comprises:
   (1) mixing at 40° C. to 160° C. in the absence of solvents:
   (a) from 62 to 90% by weight of a polyoxyalkylated diol or polyol having a molecular weight between 300 and 10,000 and a hydroxyl number between 30 and 85, and
   (b) from 8 to 30% by weight of a tackifier which is compatible with (a) and which is a normally solid, amorphous, thermoplastic resin having a softening point in the range of from 40° C. to 140° C. and a molecular weight in the range of from 200 to 1,500,
   (2) cooling the resulting solvent-free mixture of (a) and (b) to at least below 50° C. down to about room temperature, and
   (3) reacting the mixture in the absence of solvents at a temperature no greater than 50° C. with
   (c) from 2 to 8% by weight of at least one aliphatic or aromatic diisocyanate or polyisocyanate selected from the class consisting of hexamethylene diisocyanate, 4,4' - diisocyanate-diphenylmethane, 1,5 - diisocyanato-naphthalene, 1,4 - diisocyanato-benzene, 2,4 - diisocyanato-toluene, 2,6 - diisocyanato-toluene, 4,4',4'''-triisocyanato-triphenylmethane, and the addition compounds of 1 mole of trimethylolpropane and 3 moles of diisocyanato-toluene, the percentages being based on the total weight of components (a), (b) and (c).

2. A process as claimed in claim 1 wherein the component (a) has a molecular weight of from 900 to 5,000.

3. A process as claimed in claim 1 wherein component (b) is a tackifier having an acid number of less than 20.

4. A process as claimed in claim 1 wherein component (b) is a tackifier which is miscible with component (a) at 100° C. in all proportions.

5. A process as claimed in claim 1 wherein the components (a) and (c) are used in such proportions that there are present from 0.25 to 0.98 equivalents of isocyanate groups per equivalent of hydroxyl groups of component (a).

6. A process as claimed in claim 1 wherein the starting materials used have a moisture content of less than 0.1% by weight.

7. A process as claimed in claim 1 wherein the mixture of components (a), (b) and (c) is molded into a shaped article while still capable of flow at viscosities below about 80,000 centipoises and said mixture is then reacted to completion.

8. A process as claimed in claim 1 wherein the polyoxyalkylene of component (a) is selected from the class consisting of polyoxyethylene, polyoxypropylene and mixtures thereof.

References Cited
UNITED STATES PATENTS

| | | | |
|---|---|---|---|
| 3,246,049 | 4/1966 | Webber | 260—859 |
| 3,396,210 | 8/1968 | McKillup et al. | 260—859 |
| 3,437,622 | 4/1969 | Dahl | 260—24 |
| 3,509,079 | 4/1970 | Hyde et al. | 260—859 |

DONALD E. CZAJA, Primary Examiner

W. E. PARKER, Assistant Examiner

U.S. Cl. X.R.

260—858, 859